March 7, 1944.   R. L. STEVENS   2,343,340
METHOD FOR MEASUREMENT OF MOISTURE CONTENT IN GRANULAR MATERIALS
Filed Oct. 24, 1940   5 Sheets-Sheet 1

Fig. 1.

Inventor
Robert L. Stevens
Attorneys

March 7, 1944. R. L. STEVENS 2,343,340
METHOD FOR MEASUREMENT OF MOISTURE CONTENT IN GRANULAR MATERIALS
Filed Oct. 24, 1940 5 Sheets-Sheet 3

Inventor
Robert L. Stevens.

Attorneys.

March 7, 1944. R. L. STEVENS 2,343,340
METHOD FOR MEASUREMENT OF MOISTURE CONTENT IN GRANULAR MATERIALS
Filed Oct. 24, 1940 5 Sheets-Sheet 5

Inventor
Robert L. Stevens.
Attorneys.

Patented Mar. 7, 1944

2,343,340

UNITED STATES PATENT OFFICE 2,343,340

METHOD FOR MEASUREMENT OF MOISTURE CONTENT IN GRANULAR MATERIALS

Robert L. Stevens, Santa Monica, Calif., assignor, by mesne assignments, to Moisture Register Company, Los Angeles County, Calif., a corporation of California Application October 24, 1940, Serial No. 362,700

5 Claims. (Cl. 175—183)

This invention relates generally to apparatus and systems designed for measurement of moisture content in granular, shredded, pulp or powdered materials, or in materials in thin sheet or board-like form.

Conventional procedures for determining moisture content in a given material have been generally confined in the past to laboratory procedures which involve either the determination of loss of weight by heating, or the determination of the amount of water recoverable from the sample by distillation. These laboratory procedures are inherently time consuming because of the steps of accurate weighing involved and the time required for carrying out the necessary drying or distillation steps.

Electrical instruments have been provided in the past for quick determination of moisture content. Such instruments have in some instances measured the change in dielectric constant, and in some instances the change in power absorption, when samples of differing moisture content are subjected to an electric field. A difficulty necessary to be overcome in such instruments arises from the fact that granular, shredded, pulp, or powdered materials, as well as compressible solids, exhibit different electrical properties depending upon the extent to which the material is compressed or compacted. This effect results principally from two causes, first, the presence of void spaces or free air in the mass under test, particularly with reference to granular size, or closeness of packing, and second, in the case of a compressible material, the variations in effective density of the material.

A general object of the invention is the provision of an electrical method and instrument for measuring the moisture content in granular, shredded, pulp or powdered materials, or the like, or in compressible sheet materials, in which the effects of voids, air space, granular size, or density, are eliminated.

I have discovered that many if not all materials of the type in question exhibit gradual change in the measurable electrical characteristics of interest as they are compressed, but that finally a region is reached in which further compression causes little or no further change in those electrical characteristics. In accordance with the present invention, therefore, I compress the material to this region (beyond which further compression has no substantial further effects), and then take the moisture measurement reading with the material under such compression. For many materials, the pressure which I may thus use may range between values of the order of from about 1,000 to 1,500 pounds per square inch. The preferred form of instrument provided by the present invention, and with which this step of measurement under high compressive pressure may be carried out, employs a cup adapted to receive the sample of material, and an electrode disk forming the bottom of the cup and having electrodes adapted to produce an electric field that will penetrate the sample of material. A plunger fits inside this cup, and hydraulic means are provided for pressing the plunger against the material with great force. A hydraulic pump and check valve system are provided for development of the necessary fluid pressure, and to guard against developing a pressure higher than that for which the instrument is designed, a relief valve comes into operation when a predetermined hydraulic pressure is achieved. In this connection, I may in some instances, with some materials, bring the sample to such a state of compression that no further compression would have any sensible effect on the reading to be taken. In other instances, or with other materials, I may bring the sample to a state of compression such that further compression will have little effect on readings, and I may limit the compression of the sample to a predetermined point by the setting or adjustment of the relief valve, so that calibration as well as all subsequent readings may be taken at this reference point. In still other situations, or with still other materials, however, it may not be feasible to bring the sample to the state of compression at which readings are no longer substantially influenced by further changes in compression. In such instances, the relief valve enables the compression of the material at which the instrument was calibrated to be duplicated time after time, so that consistent readings are obtainable.

One present illustrative embodiment of the invention will be described in detail, reference being directed to the accompanying drawings, in which:

Fig. 6 is an enlarged detail of a portion of Fig.

1, showing a switch operating cam in switch closing position;

In the drawings numeral 15 designates generally a suitable sheet metal instrument case, having a front wall 16, a sloping wall 17 extending from the upper edge of wall 16 to a rectangular aperture 18 which extends between side walls 19, a short vertical wall 20 rising from the rearward side of aperture 18, a top wall 21, a back 22 equipped with a suitable removable door 23, and bottom 24. Mounted in sloping wall 17 is the milliammeter or other instrument 25 by which the moisture content is read.

The mechanism by which the sample or material is placed under compression is in the nature of a hydraulic press, generally designated at 26, and this hydraulic press is supported by a suitable horizontal platen 27, which in turn is mounted on the walls of the case defining aperture 18, the hydraulic press extending above and below platen 27 as shown.

Secured to the bottom of platen 27 is a hydraulic cylinder 30, here shown as having lugs 31 secured to platen 27 as by screws 32. Slidable within cylinder 30 is a piston 34, which is equipped with any suitable form of packing, for instance chevron-shaped packing rings 35 held between packing retainer ring 36 and inverted cup-shaped member 37 secured on the reduced upper end portion 34a of piston 34 by screws 38. Downward pressure is applied to piston 34 by injecting oil or other suitable pressure fluid into the head end of cylinder 30 via fluid passageway 40 and tubing 41 (see Fig. 1). This pressure is transmitted to a bottom cross head 45, which is secured to the bottom of piston 34 as by screws 46. A pair of tie rods 47 passing through perforations 47a in platen 17 (see Fig. 2) connect bottom cross head 45 to a top cross head 48. Secured as by screw 49 to the underside of top cross head 48 is a plunger 50 which is adapted to be moved downwardly into a cup ring 51 resting on the upper side of frame plate 27, plunger 50 fitting the bore of ring 51 with close sliding fit. Cup ring 51 has a free sliding fit over a disk-shaped hard plastic block 52, preferably composed of polystyrene or other suitable insulation, preferably having low high frequency losses, which is received within a circular recess 53 in the top of plate 27 and is secured to plate 27 as by screws 54. The cup ring 51 and the plastic block 52 at the bottom define the sides and bottom of a pressure chamber into which the sample to be tested is placed, and as pressure fluid is injected into cylinder 30, forcing piston 34 and the two cross heads in a downward direction, plunger 50 enters said pressure chamber and exerts downward pressure on the sample.

Figure 3:
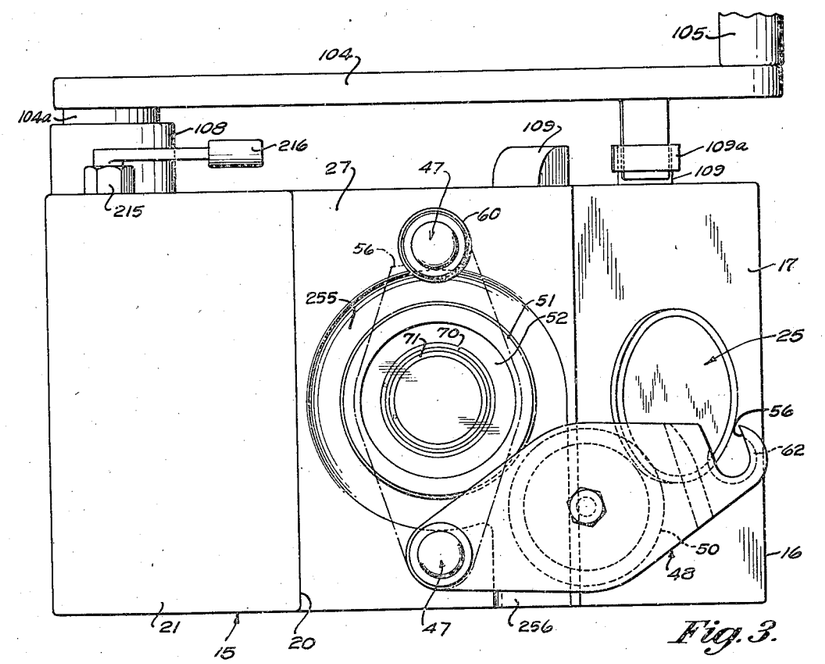
Fig. 3 is a plan view of the instrument.

In the embodiment of the invention here shown excess travel of plunger 50 after it clears the top of the cup ring is avoided by arranging for rotation of the cross head 48 and the attached plunger, about one of the tie rods 47, for instance to the position shown in full lines in Fig. 3. This movement is made possible by providing one end of cross head 48 with a slot 56 (see Fig. 3), so that the cross head is capable of being disengaged from the corresponding tie rod. The other end of cross head 48 is provided with a simple perforation 57 which passes the tie rod and permits rotation of the cross head thereon.

Means are preferably provided for yieldingly latching cross head 48 in closed or operative position. As a simple and preferred means for this purpose, I show (Fig. 2) a ring shaped latching element 60 surrounding the tie rod below the detachable end of the upper cross head and provided with a tapering nose 61 adapted to seat in a conical countersink 62 formed on the underside of the cross head, latching element 60 being urged in an upward direction by means of a coil spring 63 seating on the upper end of a collar 64 set tightly on the tie rod. A similar collar 64 set on the other tie rod supports the cross head and cylinder 50 when swung to one side, and when the cross head and cylinder are in the closed or operative position of Fig. 2 the cross head may be supported both by the last mentioned collar 64 and by the spring pressed locking ring 60 pressed upwardly by the spring 63 seating on the other collar 64. Spring pressed locking ring 60 is readily cammed downwardly to permit the cross head to be moved to or from the position of Fig. 2.

In the construction as here illustrated, collars 64 are provided with depending sleeves 65 surrounding tie rods 47 with clearance, and telescopically received inside said sleeve 65 are sleeves 66 mounted on and extending upwardly from frame plate 27. Preferably, the members 47, 65 and 66 are not in sliding engagement, and serve simply to exclude dirt from the interior of the instrument casing.

The aforementioned plastic disk 52 carries electrodes between or above which is created an electric field capable of penetrating the material on test. Such electrode elements may be of various kinds. They may, for instance, constitute the two plates of a condenser, which is connected in a circuit designed to measure changes in dielectric constant with variations in moisture content in the material within the cup ring. Circuits of this type are well known and will require no description herein. Preferably, however, I employ for this purpose a pair of electrodes which are in the output circuit of a high frequency oscillator system, the latter being designed to measure the power absorbed from the high frequency electrostatic field created between the electrodes by the moisture in the material on test. The electrodes are preferably in the form of concentric rings 70 and 71 embedded in and flush with the upper surface of disk 52, being preferably molded into the disk by well known molding methods. A preferred oscillator system is disclosed and claimed in Patent No. 2,231,035 to Robert L Stevens and James P. Dallas, entitled Power absorption metering system, issued February 11, 1941, and to which reference may be directed for a full understanding. For present purposes it will suffice to refer to the schematic diagram of Fig. 13, in which electrode rings 70 and 71 are indicated as energized by the output of a high frequency oscillator G. This oscillator preferably has the characteristics disclosed and claimed in the aforementioned application, and is indicated as having circuit leads connected to milliammeter 25. The oscillator is also indicated as having cathode and anode battery circuits A and B, controlled by the contacts of a switch S. The high frequency oscillating current delivered to the coplanar electrode rings produces an electrostatic field that arches upwardly between the rings to penetrate the material within the cup ring. The moisture within the material absorbs power from this field, thus reacting on or affecting the field in such a way as to cause a change of electrical state within the oscillator, which is read by the milliammeter 25.

Figure 1:
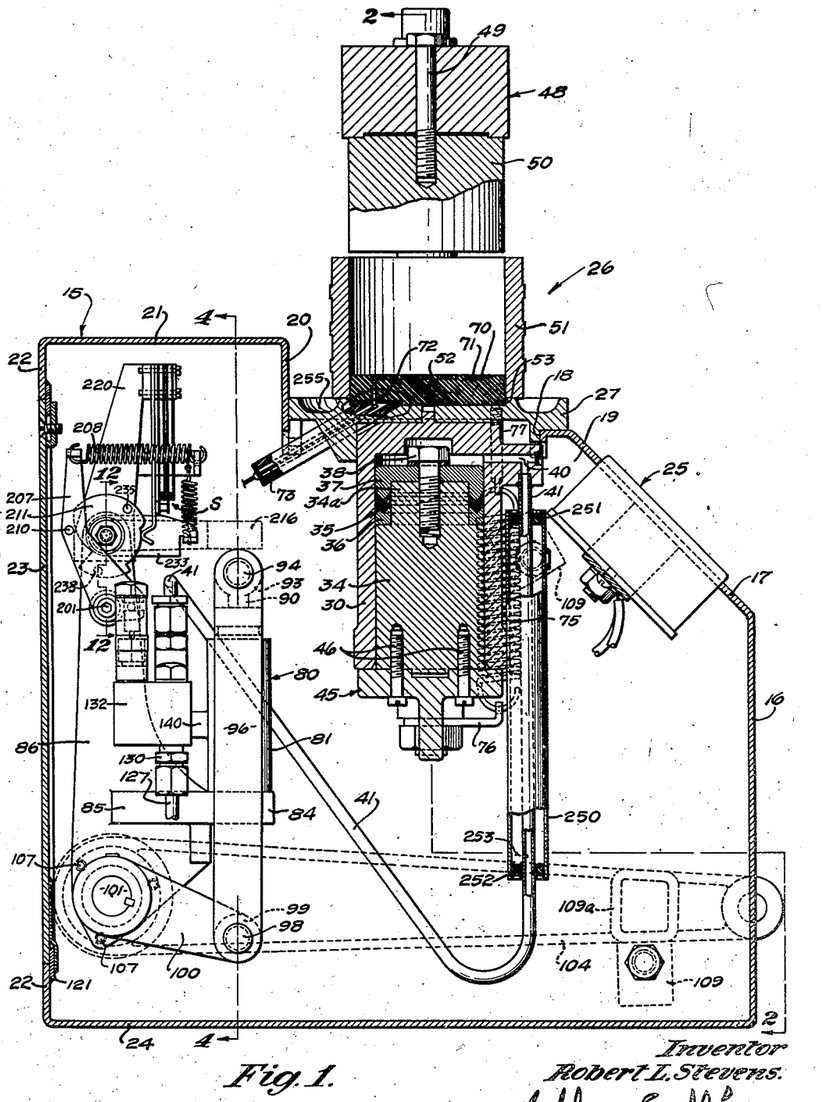
Fig. 1 is a longitudinal vertical section through the instrument, taken on accordance with section line 1—1 of Fig. 2.

Electrical connections are made to the rings 70 and 71 for instance as indicated in Fig. 1, conductive pins such as 72 extending downwardly through the disk from the electrode rings, and having connected thereto suitable conductors such as 73 which lead through suitable insulation sleeves to the oscillator unit G, not shown in Figs. 1 to 12, but which will be understood to be mounted in any suitable way inside housing 15.

A pair of coil springs 75 are provided for the purpose of elevating piston 34 and plunger 50 upon release of hydraulic pressure inside cylinder 30. As here shown, these springs are connected between bracket arms 76 mounted on the bottom of lower cross head 45 and anchor pins 11 screwthreaded into the bottom of frame plate 27.

A hydraulic pump 80 is provided for the purpose of delivering hydraulic fluid under pressure to hydraulic cylinder 30. This pump includes a vertically arranged cylindrical pump body 81 (see Fig. 4) having a bore 82 extending downwardly from its upper end, and having a reduced bore 83 extending downwardly from bore 82. The pump body 81 is secured at the bottom, as by brazing, within a cup shaped supporting member 84 formed at the end of a bracket arm 85 extending from a mounting casting 86 secured to the adjacent side wall 19 of case 15. The pump has a plunger 90 receivable with clearance within bore 83 and slidable through a packing gland 91 screwthreaded within bore 82 (see Fig. 4), suitable packing being provided, for instance as indicated at 92. The upper end of plunger 90 is set into and brazed to the bottom of a transverse sleeve 93 surrounding a cross pin 94. The reduced end portions 95 of said pin 94 are connected by means of parallel links 96 to the reduced end portions 97 of a similar pin 98, and pin 98 is surrounded by a hub 99 formed at the swinging end of a crank arm 100 keyed onto a rotatable shaft 101 that projects through the adjacent side wall 19 of the housing. Shaft 101 is journaled in a tubular boss 102 formed integrally with the aforementioned mounting member 86, and has mounted on its exterior end a manually operable crank arm 104 furnished with a suitable handle 105. A plate 106 surrounds tubular boss 102 adjacent the exterior surface of the housing side wall (see Fig. 4) and screws such as 107 pass through said plate and through side wall 19 into mounting member 86 to secure the parts tightly in assembly. To guard against the possibility of screws 107 being loosened, plate 106 is preferably furnished with a cylindrical projecting portion 108 which is positioned closely adjacent the hub portion 104a of crank 104. Stop lugs 109 are preferably mounted on the side of the case, in position to be engaged by a rubber covered bumper element 109a projecting from crank arm 104 at the proper stroke limits of the latter.

An oil inlet passageway or port 110 (see Fig. 7) opens inside bore 83 of pump 80. It will be understood that as manual crank arm 104 is worked up and down, motion is transmitted through crank arm 100 and links 96 to effect corresponding reciprocation of pump plunger 90, alternately drawing pressure fluid into and forcing it back out of the variable clearance space between the plunger 90 and bore 83.

Figure 4:
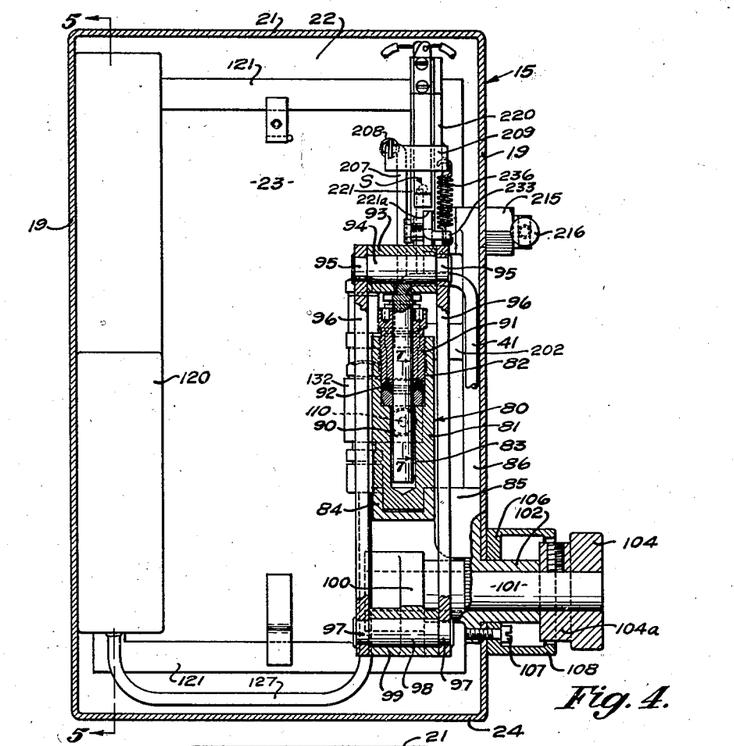
Fig. 4 is a section taken on line 4—4 of Fig. 1.
Figure 5:
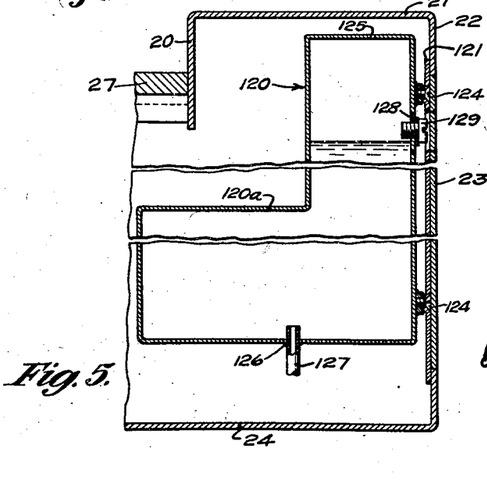
Fig. 5 is a section taken on line 5—5 of Fig. 4.

Figs. 4 and 5 show a suitable tank 120 for the hydraulic fluid detachably secured in any suitable manner to a wall of the exterior case; for instance, it may be secured to a flange 121 positioned along the edge of the opening for door 23 by means of screws 124 which are exposed when door 23 is removed. The tank is provided at the top with a breather hole 125 and at the bottom with a connection 126 with tubing 127. The tank is also furnished with a filling opening 128, closed by a screw plug 129.

Figure 9:
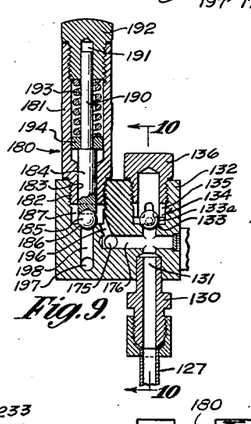
Fig. 9 is a detail section taken on line 9—9 of Fig. 8.
Figure 10:
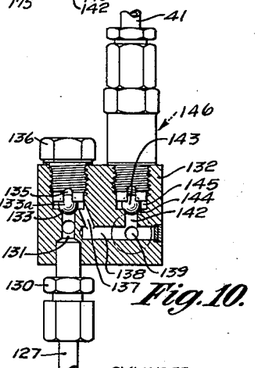
Fig. 10 is a detail section taken on line 10—10 of Fig. 9.

Tubing 127 leads from the bottom of tank 120 to a connection 130 with a fluid passage 131 extending upwardly into the bottom of a valve block 132 (see Fig. 9). Passage 131 leads through a valve seat 133 for the valve ball 133a of an intake valve 134, the enlarged valve chamber 135 above seat 133 being closed by plug 136. An angular passageway 137 leads from valve chamber 135 to a horizontal passageway 138 (Fig. 10), and the latter intersects a horizontal passageway 139 (see also Fig. 7) which extends out through a boss 140 set into the side wall of pump body 81, passageway 139 communicating with the aforementioned passageway or port 110 in the pump. Boss 140 is preferably brazed to the pump body, and the valve body or block 132 is thus supported directly on the body of the pump.

On the up stroke of the pump plunger, pressure fluid is drawn from tank 120 via line 127, and past valve ball 133a into and through passageway 137, 138, 139 and 110 to the pump. When the pump plunger is then forced down, the fluid so drawn within the pump is displaced and forced outwardly via port 110 and passageway 139. Valve ball 133a seats at this time, and the fluid passes upwardly through a passageway 142 and past a valve ball 143 that normally seats at 144 within a valve chamber 145 of a discharge check valve 146. Pressure fluid so forced upwardly past valve ball 143, which is normally held down by a valve spring 145a, is discharged via the bore 147 of a fitting 148 screwed into the top of valve block 132. The bore 147 of this fitting 148 is connected with the aforementioned pressure fluid line 41 by means of a suitable pressure tight coupling 149. As clearly illustrated in Fig. 7, bore 147 in fitting 148 communicates with valve chamber 145, and provides a shoulder at 147a which serves as a seat for the upper end of spring 145a. The pressure fluid expelled from the pump on the down stroke is thus discharged past check valve 146 to pressure line 41 leading to the upper end of hydraulic cylinder 30. By reciprocating crank arm 104, pressure fluid is taken from tank 120 into the pump and forced from there into cylinder 30, causing downward movement of piston 34 and plunger 50 against springs 75 as previously described. The design of the apparatus is such that very high hydraulic pressures may be developed, for instance, sufficient to provide for a range of compressive pressures exerted by plunger of between approximately 1,000 to 1,500 pounds per square inch.

Valve block 132 is provided with a manual release valve 155 (see Fig. 7), which is operable to allow pressure fluid to flow back from hydraulic cylinder 30 to tank 120. This valve comprises a valve body 156 screwed into a socket formed in the upper side of block 132, and provided with a longitudinal bore 157 in which is slidably mounted a valve operating rod 158, the valve body being provided at the top with a bonnet 159 containing packing 160 for the valve rod stem 161. Secured to the bottom of valve rod 158 is a valve ball 163, which is adapted to seat on valve seat 164 at the bottom of valve chamber 165. Valve ball 163 is normally held tightly on seat 164 by means of a later described spring. Extending downwardly from valve seat 164, so as to be controlled by valve ball 163, is a passageway 170, which communicates with a horizontal passageway 171 connected with chamber 145 of valve 146 by angular passageway 172. Valve chamber 165 is connected by means of angular passageway 174 and horizontal passageway 175 and intersecting horizontal passageways 175 and 176 with the aforementioned vertical passageway 131 that is in direct communication with tank 120. When it is desired to release the pressure in hydraulic cylinder 30, valve plunger 158 is lifted to the position of Fig. 7. This permits the pressure fluid in cylinder 30 to flow via tubing 41, valve chamber 145, passageways 172, 171 and 170 to valve chamber 165, and from there via passageways 174, 175 and 176 to passageway 131 and so on via line 127 to the tank.

An automatic relief valve 180 is provided and acts to limit the pressure which can be built up in hydraulic cylinder 30 by the pump. This valve has a tubular valve body 181 screwthreaded into a socket 182 formed in the top of valve block 132, and provided with a bore 183 for a valve plunger 184. A valve ball 185 secured to the lower end of valve plunger 184 is adapted to seat on a seat 186 formed in the bottom of valve chamber 187. Valve plunger 184 has a reduced upwardly extending stem 190, which is reciprocable in a bore 191 formed in a head 192 screwed into the upper end of valve body 181. A compression spring 193 acting between head 192 and a washer 194 engaging the plunger 184 urges said plunger and valve ball 185 into tight seating engagement with seat 186. Valve chamber 187 is in communication via angular passageway 196 with the aforementioned passageway 176 leading back to the tank. The aforementioned passageway 171, which will be recalled as being in direct communication with the high pressure fluid in the hydraulic cylinder, connects with a horizontal passageway 197 that leads via vertical passageway 198 to automatic relief valve chamber 187 through valve seat 186. Compression spring 193 is of such strength, either by selection, or by selection of a washer 194 of proper thickness, that valve ball 185 will be unseated and permit high pressure fluid to flow from the discharge side of pump valve 146 through passageways 196, 176 and 131 to tubing 127 communicating with the tank when a predetermined maximum hydraulic pressure is reached. When this predetermined hydraulic pressure is reached, no further increase of pressure is possible, further operation of the pump simply resulting in pressure fluid being bypassed through the automatic relief valve.

Figure 11:
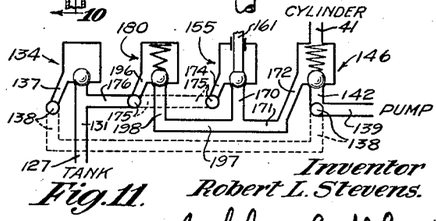
Fig. 11 is a diagram of the valves shown in Figs. 7 to 10.

The valve system will be readily understood from inspection of the developed diagrammatic view of Fig. 11, from which it will be seen that the pump draws fluid from the tank via line 127 and valve 134, and discharges it to line 41 and hydraulic cylinder 30 through valve 146. Upon reaching predetermined maximum pressure in the hydraulic cylinder, further pressure fluid delivered from the pump by-passes via automatic relief valve 180 back to the incoming pressure fluid line 127. To release the pressure built up in the hydraulic cylinder, manual release valve 155 is opened, allowing pressure fluid from the hydraulic cylinder to flow back to line 127.

Figure 6:
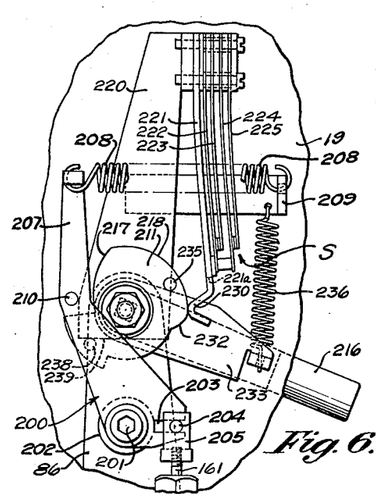
Figure 12:
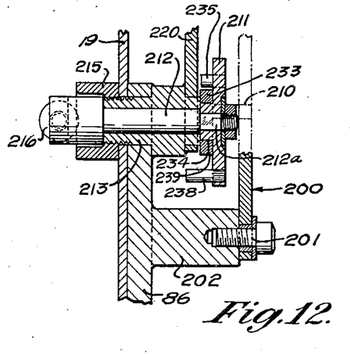
Fig. 12 is a detail section taken on line 12—12 of Fig. 1.

The operating stem 161 of manual release 155 is connected with an operating lever 200, which is pivotally mounted at 201 on a post 202 extending from mounting 86 (Figs. 6 and 12). This lever 200 has a notch 203 engaging a cross pin 204 carried by a clevis 205 to which valve stem 161 is connected. Lever 200 includes an operating arm 207, and a tension spring 208 connected between the upper end of arm 207 and a stationary bracket 209 constantly urges lever 200 to rotate right-handedly, as viewed in Fig. 6, so as to move valve stem 161 in a downward direction, and thus maintain valve ball 163 tightly on its seat. The manual release valve must of course be held seated under greater spring pressure than is exerted against the automatic relief valve, so as to assure that the latter will have a chance to operate.

Arm 207 of lever 200 carries a pin 210, which is adapted to be engaged by a flat plate cam 211 that is mounted on the squared end portion 212a of a rotatable, manually operable shaft 212. Shaft 212 is journaled in a bushing 213 extending through mounting 86 and through exterior case wall 19, bushing 213 being preferably permanently secured to member 86 as by brazing. A nut member 215 is screwed onto bushing 213 on the outside of wall 19, and a manual operating arm 216 is tightly mounted on the exterior end of shaft 212. When it is desired to operate manual release valve 155, manual operating arm 216 is lifted, bringing a rising portion 217 of cam plate 211 to bear against pin 210 carried by lever arm 207, and thus swinging said arm from the position of Fig. 6 to that of Fig. 7. The stem 161 of valve 155 is thus elevated and valve ball 163 unseated, so as to permit by-pass of pressure fluid from the hydraulic cylinder back to the tank. Beyond rising portion 217, the cam has a concentric circular portion 218, onto which the pin 210 finally rides, and this portion of the cam holds the arm 207 in the release position of Fig. 7 against return spring 208 while the springs 75 then lower the piston 34 and plunger 50. Attention is particularly directed to the fact that cam plate 211 is normally out of engagement with pin 210, so that the valve is held properly seated under the action of spring 208 under all conditions except when the manual operating arm 216 is elevated.

Figure 13:
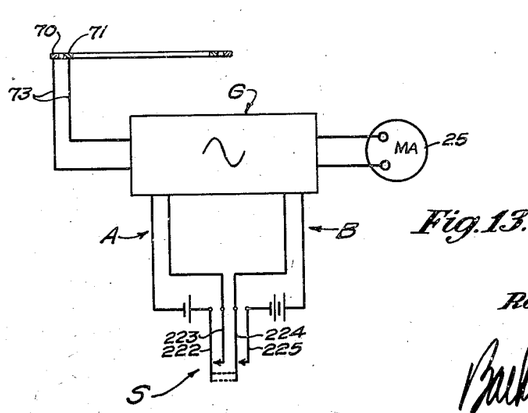
Fig. 13 is an electrical diagram of one suitable electrical system.

The same arm 216 used for operation of manual release valve 155 also, by movement in the reverse direction, operates switch S closing the cathode and plate battery circuits A and B of oscillator G. A bracket arm 220 is mounted on the inner end of the aforementioned bushing 213, as clearly illustrated in Fig. 12, and carries at the top a flat spring switch-operating arm 221, as well as spaced and insulated switch arms 222, 223, 224 and 225. One pair of these switch arms are in the filament battery circuit, while the other pair are in the plate battery circuit, as indicated in Fig. 13.

The lower hooked end portion 230 of arm 221 is engageable by a shoulder 232 of cam plate 211 when the cam plate is rotated from the position of Fig. 1 to that of Fig. 6. Such engagement causes deflection of arm 221, and resulting closure of the pairs of contacts carried by the pairs of switch arms 222, 223 and 224, 225, as will be understood. As will appear, cam plate rotates right-handedly, as viewed in Figs. 1 and 6, in thus closing the switch arms, and such movement results from downward movement of operating arm 216.

Figure 7:
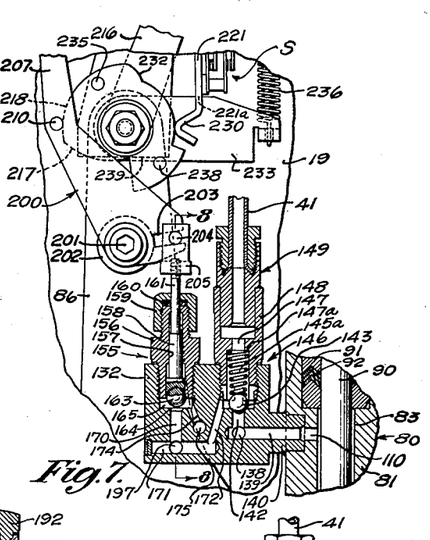
Fig. 7 is a fragmentary detail, similar to a portion of Fig. 6, and partially in section in accordance with line 7—7 of Fig. 4.
Figure 8:
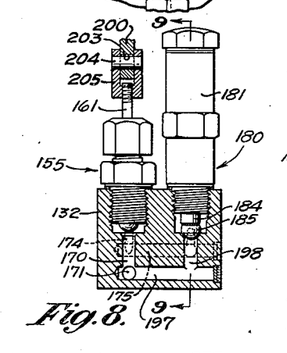
Fig. 8 is a detail section taken on line 8—8 of Fig. 7.

An arm 233 is rotatably mounted on a hub 234 of cam plate 211 (see Fig. 12) and is engaged by a pin 235 projecting rearwardly from the cam plate as the latter is being rotated to switch closing position. Thereafter, further rotation of the cam plate in a right-handed direction must be accompanied by corresponding movement of arm 230, against the restraining influence of a return spring 236 connected between arm 233 and the aforementioned bracket 209. As shown in Figs. 4 and 6, the bracket 209 may be mounted on the switch carrying bracket 220. When arm 216 is released spring 236 returns it and cam plate 211 to the neutral position of Fig. 1. Preferably, cam plate 211 is provided with a stop pin 238, which engages the lower end 239 of bracket arm 220 to stop further rotation of the cam when the cam has been moved either to the switch closing position of Fig. 6, or the valve opening position of Fig. 7. Upward movement of arm 233 beyond the position of Figs. 1 and 7 is prevented by the engagement of the upper edge of said arm against a shoulder 221a on switch operating arm 221 (Fig. 4), this provision being made to guard against the arm 233 being moved under the influence of spring 236 against cam pin 233 and so tending to rotate the cam left-handedly to a position in which it would engage and possibly move pin 210 carried by valve operating arm 207.

The operation of taking a moisture test of a granular, powdered, shredded or other similar material, is as follows: The sample of material is placed in cup ring 51 and the upper cross head 48 then latched in position with plunger 50 in position to enter the cup ring. Then, with operating arm 216 in the neutral position of Fig. 1, pump 80 is operated by means of crank arm 104 to pump pressure fluid from tank 120 into the upper end of hydraulic cylinder 30. This causes hydraulic piston 34 to descend and to draw plunger 50 down into the cup ring, compressing the sample of material between its lower end and the electrode carrying block 52. The pump is operated until fluid pressure within hydraulic cylinder 30 reaches the predetermined value for which automatic relief valve 180 is adjusted. Further operation of the pump simply causes pressure to by-pass through the automatic relief valve, as above described. A moisture reading is then taken by depressing operating arm 216, which operation closes the contacts of switch S, thereby energizing the oscillator, and therefore the electrodes, whereupon meter 25 shows a deflection. Following taking of the meter reading, operating arm 216 is elevated to rock cam plate 211 to the position of Fig. 7, in which manual release valve 155 is held open. The pressure fluid thereupon flows from hydraulic cylinder 30 back to tank 120, being expelled by the upward force exerted on piston 34 by return springs 75. Elevation of operating arm 216 thus results in releasing the hydraulic pressure and in causing the hydraulic piston 34 and plunger 50 slowly to rise.

When the manual release valve is first opened, there is a tendency for the pressure fluid to surge back into tank 120. To prevent this surging pressure fluid from being ejected through vent 125 in the top of the tank, the connection 126 between the tank and pressure fluid line 127 is placed underneath a horizontal tank wall 120a which is at an elevation substantially below the top of the tank. Thus any surging pressure fluid will be deflected by wall 120a and will be prevented from reaching and escaping via air vent 125.

With some only very slightly compressible materials, difficulty is sometimes encountered in maintaining the hydraulic pressure following operation of the automatic relief valve. Thus, as the relief valve opens, four or five drops of oil may escape therethrough before the valve ball again seats, and the volume of this amount of oil may approximate, or at least represent a large share of, the increment by which the volume of the material on test has been decreased by the pressure of the plunger. The result is substantial fall of pressure and expansion of the material back to or toward its original volume. To guard against this condition, I preferably provide an air compression chamber in communication with the high pressure oil system. As here shown, a sleeve 250 surrounds a vertical portion of high pressure oil tubing 41, and has heads 251 and 252 connected to the tubing. A slot 253 is formed in the tubing in the lower portion of the sleeve, allowing oil to enter the sleeve and to compress a volume of air in the upper end of the sleeve. The trapped air, being highly compressed, expands as excess oil passes the relief valve, and thus tends to prevent sudden loss of pressure in the high pressure system.

Figure 2:
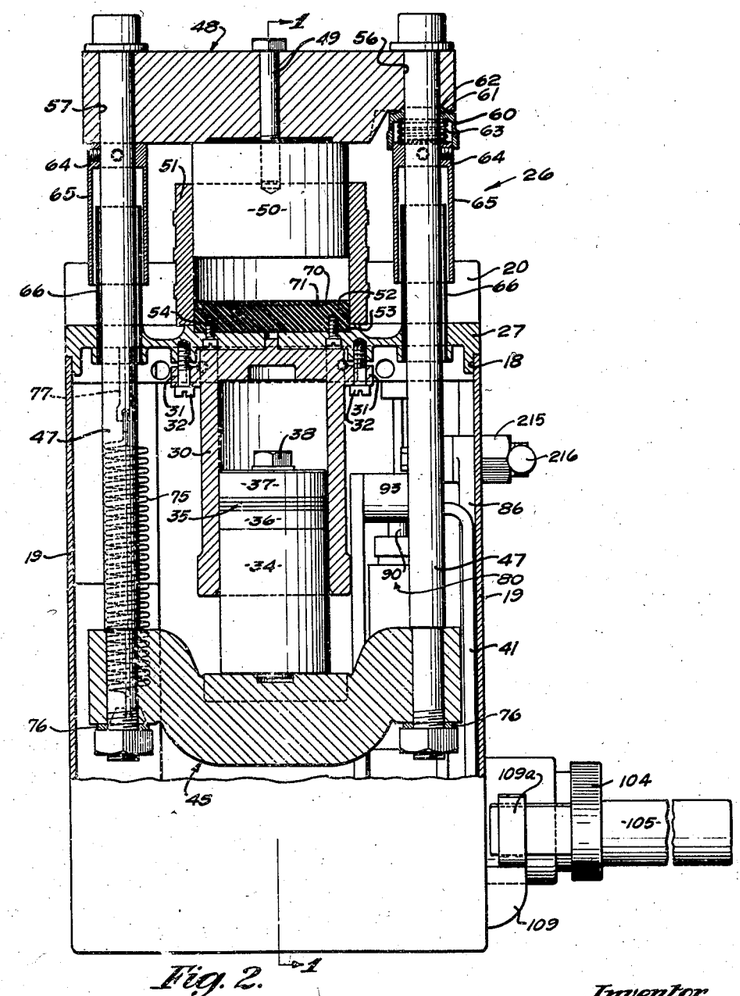
Fig. 2 is a transverse section taken on broken line 2—2 of Fig. 1.

Platen 27 is preferably provided with a gutter groove 255 surrounding electrode block 52, and adapted to discharge at one side of the platen as at 256 (see Figs. 1, 2 and 3). This gutter tends to catch any material that may be spilled around the cup ring, especially during removal of the cup ring, and facilitates brushing such material from the top of the platen. The groove is also available to catch any oils or other liquids that may under any conditions be expressed from the material under compression.

Thus far the description has been confined principally to granular and similar materials. The apparatus is suited also, however, to use with such materials as paper, cardboard, wallboard, fibre, padding, felt and the like, which may be of the nature of flat sheets or strips, and which are compressible to some degree. When it is desired to test such materials a punch may be used to cut circular disks from the material, which disks have a diameter such as to fit into the pressure cup so that the plunger may be mounted upon them and they may be held under pressure in the same manner as has been described above for granular materials. If the sheet stock from which the sample is cut is very thin, and, therefore, is of such dimensions that the sample thickness will not be great enough to prevent the high frequency field of the electrodes from penetrating through it, several such disks may be piled one upon another to give the required thickness. Of course, sheets of material of any desired shape, so long as they cover the electrodes and can be passed between the tie rods of the unit, may be tested in the same manner by removing the cup ring from the apparatus and placing the sheets directly upon the electrodes, after which the upper plunger may be lowered directly upon them.

The method of the present invention contemplates taking the moisture reading preferably while the material is held under a sustained pressure of such magnitude that further pressure would have no sensible effect on the moisture reading to be taken. What this means, of course, is that compression has been carried high enough that substantially all expressible air has been removed, all void spaces reduced as far as possible, and the material compressed in volume until it becomes a homogeneous mass of substantially maximum density. If the material is of such a nature that such a degree of compression is not feasible, the compression is at least raised, if possible, to the range where further increments of increased pressure have no more than slight or negligible effects on the readings. Automatic limiting of the maximum compression by the automatic relief valve then assures consistent readings. If materials are encountered which cannot practically be compressed to the range described, i. e., where further compression would cause but slight further variations in readings, then reliance for consistent results depends upon, first, placing the material under a relatively high compression, so that variables are reduced as much as possible, and second, on the automatic relief valve to assure that the material is placed under exactly the same compression for every test.

The invention has been particularly described in the aspect of moisture measurement. However, in situations where moisture is substantially constant, or absent, or negligible as compared with the effects of some other substance or ingredient that may be present in variable or unknown quantities, and that may, like moisture, have an effect on the field of the electrodes that can be read within or at the oscillator, the instrument may be utilized to measure or indicate the presence and or quantity of such other substance or ingredient.

I have now described in considerable detail one form of instrument by which my invention may be carried into practical effect; it will be understood, however, that this is for illustrative purposes only, and that various changes in design, structure and arrangement may be made without departing from the spirit and scope of the invention or of the appended claims.

I claim:

1. The method of making a moisture test of granular, powdered, shredded or other loose or compressible materials, that comprises compressing a sample of the material, creating a high frequency field in said material, and determining the moisture content of the material by its influence on said field while sustaining the compression of the material at a pressure value sufficient that further increases in pressure do not materially influence the result.

2. The method of making a moisture test of granular, powdered, shredded or other loose compressible materials, that comprises compressing a sample of the material substantially to a predetermined point at which void spaces are eliminated and free air expressed, creating a high frequency field in said material, and determining the moisture content of the material by its influence on said field while the compression of the material is sustained at said predetermined point.

3. The method of making a moisture test of granular, powdered, shredded or other loose or compressible materials, that comprises compressing a sample of the material against an electrode means adapted to be energized to produce a field which penetrates the material and which is affected by the moisture content in the material, increasing the compression of the material to a predetermined point beyond which further increases have materially reduced effects on the field, and determining the moisture content of the material by its influence on said field while the material is held at said compression point.

4. The method of making a moisture test of granular, powdered, shredded or other loose or compressible materials, that comprises compressing a sample of the material, creating a high frequency electric field in said compressed material, whereby electric power is absorbed from said field by the material in an amount depending upon the moisture content of the material, establishing the compression of the material at a predetermined point beyond which further increases in compression have materially reduced effects on the amount of power absorbed by the material, and determining the moisture content of the material from the amount of electric power which it absorbs while said compression is sustained.

5. The method of making a moisture test of granular, powdered, shredded or other loose or compressible materials, that comprises compressing a sample of the material, creating a high frequency electric field in said compressed material, whereby electric power is absorbed from said field by the material in an amount depending upon the moisture content of the material, establishing the compression of the material at a predetermined point, and determining the moisture content of the material from the amount of electric power which it absorbs while said compression is sustained.

ROBERT L. STEVENS.